United States Patent [19]

Ganser et al.

[11] 3,727,468
[45] Apr. 17, 1973

[54] ROTARY MOTION TRANSMITTING DEVICES

[75] Inventors: Robert O. Ganser, Norwalk; Igor E. Dolgen, Monroe, both of Conn.

[73] Assignee: The Perkin-Elmer Corporation, Norwalk, Conn.

[22] Filed: Feb. 10, 1971

[21] Appl. No.: 114,202

[52] U.S. Cl. ............... 74/63, 350/272, 346/33 A
[51] Int. Cl. ............................... F16h 21/02
[58] Field of Search ............... 74/63, 89.15; 350/272; 346/33 A

[56] References Cited

UNITED STATES PATENTS

| | | | |
|---|---|---|---|
| 2,325,582 | 8/1943 | Andersen | 74/63 |
| 2,967,907 | 1/1961 | Stamps | 350/272 |
| 3,176,312 | 3/1965 | Reinsch | 350/272 |
| 3,363,259 | 1/1968 | Taylor et al. | 346/68 |
| 3,396,403 | 8/1968 | Ford et al. | 346/33 A |
| 3,460,153 | 8/1969 | White | 346/33 |

FOREIGN PATENTS OR APPLICATIONS

| | | | |
|---|---|---|---|
| 921,080 | 3/1963 | Great Britain | 74/63 |
| 110,792 | 1964 | Czechoslovakia | 350/272 |

Primary Examiner—Charles J. Myhre
Assistant Examiner—Wesley S. Ratiff, Jr.
Attorney—Edward R. Hyde, Jr.

[57] ABSTRACT

A rotary drive mechanism includes a firs driving element rotatable about a first main axis, carrying a driving pin which connects it to a second intermediary element, which is usually constrained to rotate about a second axis, more remote than the first axis from the driving pin connection. The intermediary element carries a second driving pin connected to a third finally driven element which is constrained to rotate about the same first axis, the second driving connection being closer to the second axis than the first axis. In this manner, the third element is driven at a compound reduction angular rate equal to the product of the reduction rates caused by each of the two connections between the elements. Means are also provided for optionally both freeing the shaft defining the second axis so as to release this constraint on the intermediary element, and for connecting the third finally driven element directly to the first driving element, thereby producing a direct or 1:1 angular rotation rate therebetween.

7 Claims, 4 Drawing Figures

SHOWN IN 5:1 POSITION

I. E. Dolgen
R. O. Ganser
INVENTOR(S)

Daniel R Levinson
ATTORNEY

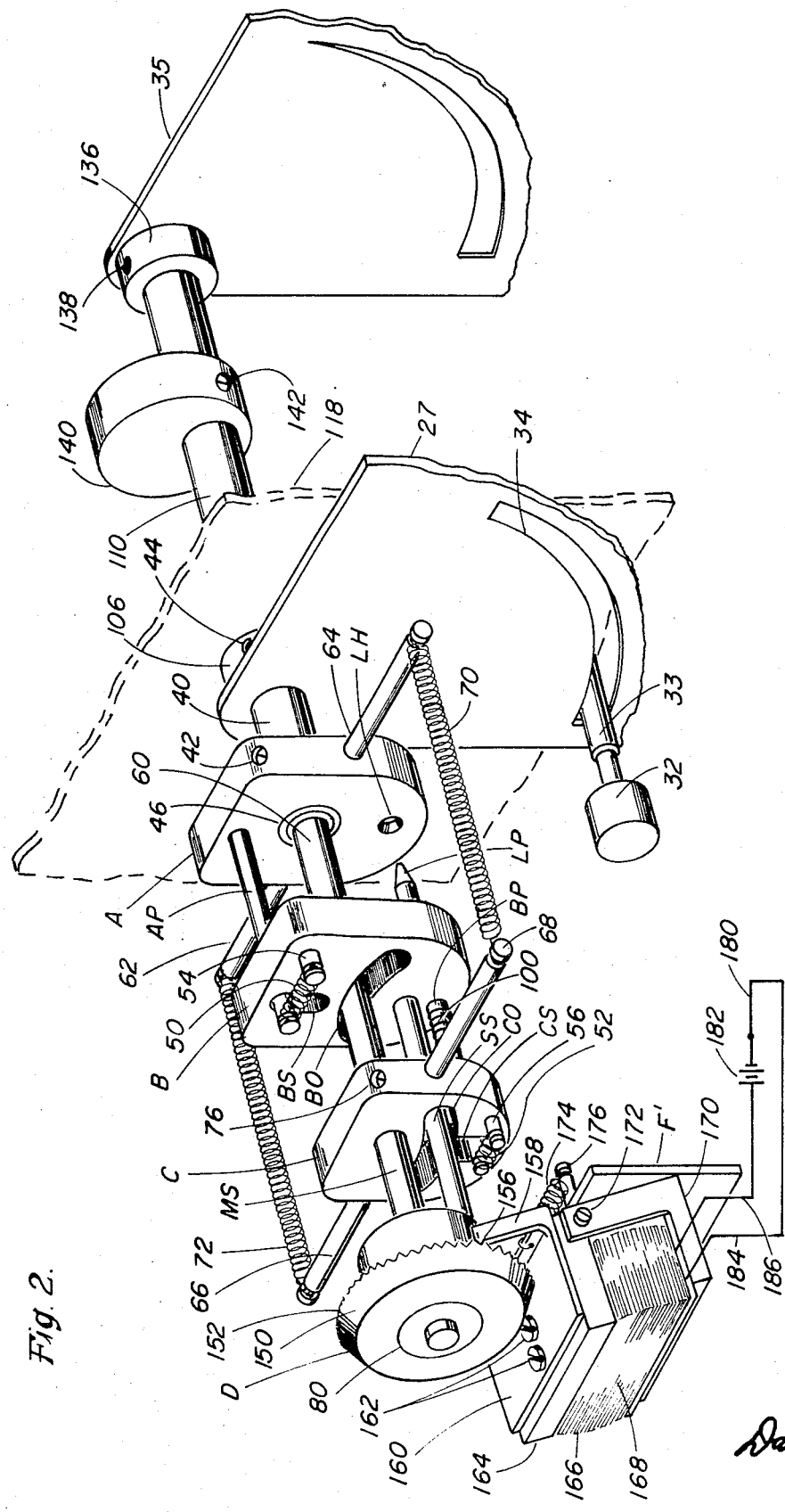

ROTARY MOTION TRANSMITTING DEVICES

GENERAL DESCRIPTION

This invention relates to driving mechanisms, more particularly of the type that cause a change in the rotation rate of the finally driven element relative to the original rotation rate of the initial or driving element. More specifically, the invention relates to a device of this type which, although relatively simple in construction, is capable of causing the initial driving element to drive the final driven element at either of two different rotation ratios (for example, 5:1 or 1:1).

Generally, an exemplary device according to the invention comprises a first driving element rotatable about a first axis (hereinafter referred to as the main axis, for convenience), the first driving element carrying a coupling element (for example, a first pin) which connects it to a second or intermediary element, which is constrained to rotate about a different axis (hereinafter referred to as the second axis or axis of the secondary shaft) so as to drive the second element at a different angular rotational rate; the intermediary element in turn carries a second connecting element or pin drivingly engaging a third or finally driven element, which in turn is restrained to rotate about a third axis, different from said second axis (the third axis in the preferred exemplary embodiment being in fact coincident with the original first axis or axis of the main shaft). If the first connecting pin is closer to the first or main axis than it is to the second or auxiliary axis, the intermediary (second) element will be driven by a smaller angle about this second axis than the angle that the driving element makes about its first axis. Similarly, if the second connecting pin between the intermediary element and the final driven element is closer to the auxiliary axis than the third axis, the intermediary element will drive the final element at a further reduced angular rate. In this manner, there is a step-down in angular rotation rate both from the first driving element and the intermediary element, and from the intermediary element to the final driven element, so that the finally driven element is driven at an angular rate which is equal to the product of the two step-down (i.e., each less than one) angular transmission rates of each connection.

The invention also provides a relatively simple means for changing the overall angular or rotational rate of the device, by changing the relative rotation rates of the three elements. In the exemplary embodiment of the invention, in fact, the finally driven element is optionally caused to be rotationally locked to the first driving element (while simultaneously removing any constraint on the intermediary disc originally caused by the second axis or secondary shaft), so that the optional other rotational rate relationship between the original driving element and the final driven element is one-to-one (assuming the first and third axes to be coincident). In the preferred illustrated embodiment of the invention, the first and third axes are coincident and may therefore be called the main axis, which allows the device of the invention to be introduced in many preexisting apparatus by simply replacing (part of) a single shaft with the device according to the invention, thereby allowing the option of, say, the same one-to-one ratio as would be obtained before such replacement, plus a different ratio, (e.g., five-to-one) without causing major redesign of the apparatus into which the device is incorporated.

For example, in certain types of chart recorders for, for example, spectrophotometers, such as the apparatus shown in U.S. Pat. No. 3,363,259 issued on Jan. 9, 1968, to L. H. Taylor et al., a motor drives a quadrant (27, in said patent) about a shaft or spindle (31), which quadrant ultimately drives the stylus carriage (15) by means of a chain (17); attached to the same spindle (31) shaft is an optical attenuator (35), so that the quadrant (27) and therefore the stylus or pen carriage are moved in direct proportion to the rotational movement of the attenuator. In this manner, the stylus may present (as, for example, the ordinate) an indication on a chart (4) of the position of the optical attenuator, and therefore of the physical quantity being measured (radiation transmission in an absorption spectrophotometer, for example). When the quantity being measured (e.g., transmission) does not vary over the entire scale of the instrument (say, 100 percent) but is limited to very small values (say, all below 20 percent), it is desirable to effectively multiply or "expand" the scale (say, by a factor of five), so as to cause the stylus to move at this augmented (say, five times) rate relative to the attenuator. The device, according to the invention, may be substituted for a shaft or spindle (31) so as to cause a say, five-to-one reduction in rotation rate of the optical attenuator as compared to the quadrant (27) which directly drives the stylus or pen carriage (15). Such five-to-one reduction will of course cause movement of the pen or stylus carriage (and therefore, of course, the stylus or pen itself) at a rate five times as great as the attenuator, so that such exemplary reduction (5:1) will cause the pen to move the entire (ordinate direction) of the chart when the attenuator has only moved from its zero to its 20 percent transmission position (i.e., from its 100 percent absorption to its 80 percent absorption position). Similarly any 20 percent segment of the whole (100 percent) range of angular movement of the attenuator may be made to cause 100 percent movement of the pen quadrant so as to cause 5:1 scale expansion of pen movement relative to attenuator movement over any (no more than 20 percent) segment of attenuator rotation. As previously stated, the device of the invention is also readily adapted to yield a one-to-one rotational ratio as well, when the values being measured vary by amounts greater than say, 20 percent (say, transmission) in the exemplary embodiment incorporated in, for example, spectrophotometers of the type mentioned above.

In general, besides affording two different rotational ratios (e.g., five-to-one and one-to-one), the rotary driving mechanism according to the invention is relatively simple to manufacture and assemble without sacrificing relatively high precision, is compact in all dimensions, in its preferred form has its input and output axes coincident, and (particularly in view of the last two mentioned characteristics) may be readily installed in existing apparatus (for example, spectrophotometers) by merely substituting the inventive driving mechanism for part of a shaft or spindle (as at 31 in the above-mentioned patent).

An object of the invention is the provision of a relatively inexpensive and easily-installed driving mechanism, which offers a choice of two rotational driving rates.

A related object of the invention is the provision of a mechanism of the type just described which is compact, so as to be easily installed in apparatus without requiring redesign or extensive modification of the existing apparatus.

A further object of the invention is the provision of a mechanism of the type described above which has its input axis and its output axis coincident, so as to allow it to be substituted directly for part of an existing single shaft.

A more specific object of the invention is provision of a two-speed driving mechanism of the type described above which may be installed between a driving means, directly connected to a readout means (e.g., a stylus in a chart recorder) and the means affecting a physical quantity (e.g., an optical attenuator), so that the former moves at either of two different rates relative to the latter (attenuator) means (for example, either at a five-to-one or one-to-one rotational rate).

Other objects, features and advantages of the invention will be obvious to one skilled in the art on reading the following detailed description in conjunction with the accompanying drawings in which:

FIG. 2 is a perspective view of a specific preferred embodiment of the invention including both all of the elements of the driving mechanism, as well as the manner in which a, for example, pen drive quadrant and an optical attenuator may be connected to the driving element and finally driven element, respectively;

Figure 1:
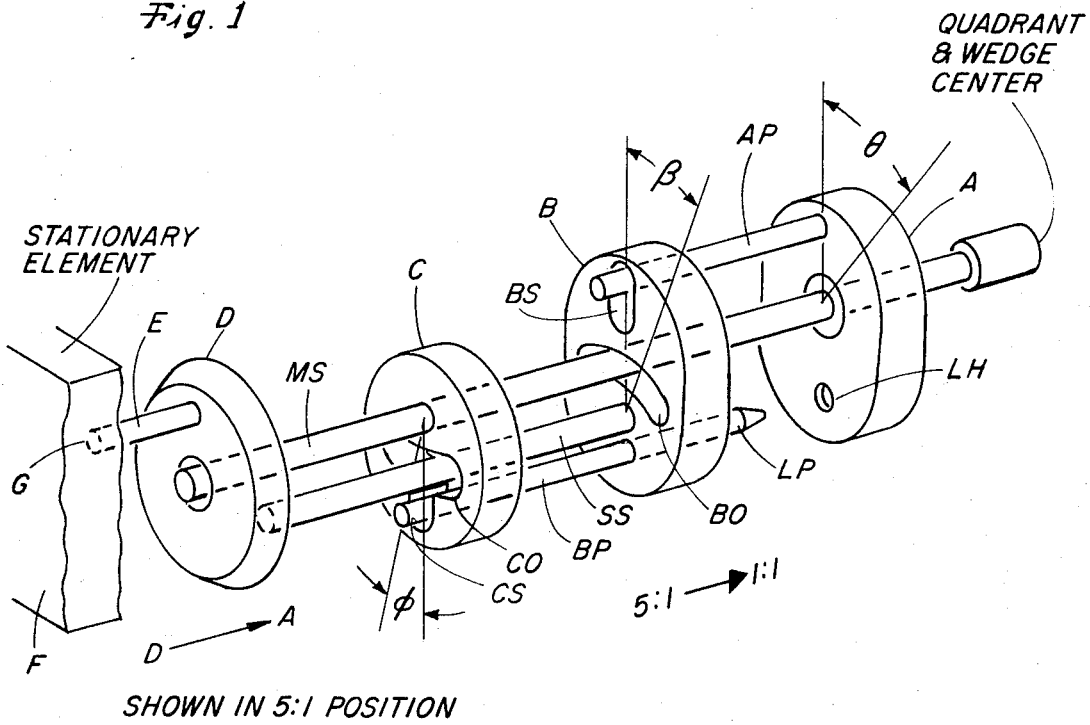
FIG. 1 is a schematic or diagramatic perspective view of the main elements of a driving mechanism according to the invention, which is utilized to explain the general operation of the invention.

In FIG. 1, the three main elements of the rotary motion transmitting device are referenced A, B and C, all of which are schematically illustrated as being generally disc-shaped in form. Hereinafter it is assumed that the first element A is the one that is rotated by some motive means, and that the third element C is the one ultimately driven (either indirectly or directly) by the first element A; for purposes of ease of expression and concreteness, this relationship will hereinafter be assumed, but it is in general possible to operate the device in the converse manner as will be obvious to one skilled in the art. The first or driver element A is free to rotate about but constrained to rotate concentrically relative to the finally driven or main shaft MS (and preferably restrained from longitudinal movement along the main shaft axis). On the other hand, the intermediary element B is neither connected to nor constrained to rotate about (nor constrained as to longitudinal movement along) the axis of the main shaft MS, by being provided with a relatively large generally arcuate opening BO. The third or finally driven element C is rigidly attached and therefore is constrained to rotate with and about the axis of the main shaft MS (and, in fact, drives this main or finally driven shaft).

The intermediary element B is rotatably attached to the secondary shaft SS so as to be rotatable about (but immovable longitudinally of) the shaft. The left-hand end of the secondary shaft is rigidly attached to a fourth, generally disc-shaped element D, which is constrained to remain concentric with the main shaft MS, but is free not only to rotate relative thereto, but to move longitudinally (i.e., generally to the right from the position shown in FIG. 1) along the main shaft as well, as indicated by the directional arrow DA. When the actuating disc D is in its left-most position, as illustrated in FIG. 1, it is constrained from rotation about the main shaft MS, this constraint being schematically illustrated in FIG. 1 as a pin E entering into a hole G in any fixed member F. Thus, in the position of the actuator D shown (i.e., to the left), the secondary shaft SS is rigidly fixed in space (by elements D, E, and F); the main shaft MS is free to rotate, but its axis is fixed in space (by conventional bearings to fixed elements, such as panels, brackets or the like, not shown); the driven element C is rigidly constrained to rotate with the main shaft (a generally arcuate opening CO being provided in element C to avoid its engaging the secondary shaft SS); the intermediary element B is constrained to rotate about the axis of (but not with) the (completely fixed) secondary shaft SS; and the driver element A is constrained to rotate about the axis of (but not with) the main shaft MS.

The driving connection between the driver element A and the intermediary element B is provided, for example, by means of a first interconnecting or driving pin AP, which is rigidly attached (as by press-fit) to element A and enters a narrow radial slot BS in the intermediary element B. The driving interconnection between intermediary element B and finally driven element C is provided by a similar second driving or interconnecting pin BP, rigidly attached to (as by being press-fit in a hole in) element B and entering a narrow radial slot CS in the finally driven element C. The second interconnecting pin BP continues through the intermediary element B as a locking pin LP, which in the position of the parts shown in FIG. 1 does not engage the locking hole LH in the driving element A (the manner of causing and the effect of such engagement being explained after the explanation of how the device operates in the position shown in FIG. 1).

For the position of the elements shown in FIG. 1, rotation of the driving element A (about the axis of the main shaft MS) will cause, through the first interconnecting pin AP, rotation of the intermediary element B about the axis of the secondary shaft SS. For a given angular rotation of the driving element A, the intermediary element B will rotate through a smaller angle, since the point of action of the interconnecting pin AP on intermediate element B is farther removed from its axis of rotation (namely, shaft SS) than for the axis rotation (namely, main shaft MS) for the driving element A. Thus, for a given rotational angle, say, $\theta$, of driving element A, intermediary element B will be driven through a smaller angle, say, $\beta$. Since in an analogous manner, the second pin BP interconnecting intermediary element B and finally driven element C is substantially closer to the axis (namely, that of secondary shaft SS) of the intermediary element B than it is to the rotation axis (MS) of the final element C, there will be a similar reduction in the rotation rate of the final element C relative to the rotation of intermediate element B. Stated in other terms, if the intermediary element B rotates through an angle $\beta$, the finally driven element C will rotate through a smaller angle $\phi$. Thus, for a given angle of rotation $\theta$ of the original driving element A, the final driven element C will be driven through a substantially smaller angle $\phi$ because of the compound reduction rate caused by the fact that each of the connections (AP and BP) between the elements causes a rotation rate reduction, so that the overall angular rate reduction is the product of these two angular rate reductions.

In a particular exemplary embodiment invention actually constructed, the relative distances between the first driving pin AP and the two different axes of rotation of the driving element A and the intermediary element B (namely, the axis of the main shaft MS and the axis of the secondary shaft SS, respectively) was such that the intermediary element B was driven through an angle $\beta$ approximately equal to 0.6 $\theta$. The relative distance between the second connecting pin BP from the rotation axis of element B to its distance from the axis of rotation of the finally driven element C (these axes being, of course, respectively the axes of the secondary shaft SS and the main shaft MS) were such as to cause element C to rotate through an angle $\phi$ equal to approximately 0.3 $\beta$. Therefore, the compound angular reduction between the original driving element A and finally driven element C was equal to the product of these two approximate numbers, or about 0.2 (i.e., $\phi$ equal approximately 0.20), thus yielding somewhat more than five-to-one angular rate reduction. Since the first connecting pin AP revolves about a circular arc concentric with the axis of rotation of element A (namely, the axis of that main shaft MS), this circular arc is not concentric about the axis of the secondary shaft SS (which defines the axis of rotation of the intermediary element B); it is for this reason that the connection between pin AP and intermediary element B is in the form of radial slot BS, so as to avoid any binding effect. Similarly, since the second interconnecting pin BP follows a circular arc about the axis of the secondary shaft SS, it does not follow a path that is concentric to the axis (the main shaft MS) of the finally driven element C, so that a slot CS in element C prevents binding that otherwise might occur. Despite the fact that each of the interconnecting or driving pins AP and BP do not make exactly circular arcs about the axis of the elements they drive (namely, B and C respectively), in an actual embodiment of the invention corresponding generally to the one schematically shown in FIG. 1 (and more particularly, to the more specific, physical embodiment hereinafter described) exhibited almost an exactly constant ratio of angular reduction of the first element A relative to the finally driven element C over a range of rotation of 90° of the first element, namely, no less than 4.99 and no more than 5.01 angular reduction rate (that is, $\theta$ $\phi$). It may be noted in passing that although the other dimensions shown in FIG. 1 (and in the more detailed specific embodiment later described) are approximately to scale relative to this actually constructed embodiment, the longitudinal dimensions (i.e., along the axes of the various shafts and pins) is greatly exaggerated so as to more clearly show the interconnections. The actual device constructed was extremely compact in the longitudinal direction as well as in the vertical direction (the space between each of the elements A, B, C, and D being only about one-fourth as much longitudinal space as shown between any two of the adjacent elements).

When it is desired to change the ratio between the driving element A and the driven element C, the actuator D is moved to the right as indicated by arrow DA, which simultaneously moves the intermediary element B to the right (since element B, although free to rotate about the secondary shaft SS is constrained longitudinally relative thereto), which in turn causes the locking portion LP of the pin BP rigidly held by element B to move into the locking hole LH in element A. Simultaneously, the actuating element D is freed from constraint against rotation about the main shaft, schematically exemplified in FIG. 1 by the removal of the constraining pin E from the fixed member F (although actually accomplished in a different manner in the more specific structural embodiment hereinafter described). This removes that constraint on the secondary shaft SS (rigid with the actuator element B) that completely fixes it in space, so that it may thereafter revolve about the main shaft MS. In this (moved-to-the-right) position of elements B and D, the single continuous lower-most pin BP, LP locks together (in the rotative sense) all three elements A, B, and C (and, incidentally, through the now freed secondary shaft SS also the actuator element D). Therefore, the finally driven element C will rotate through an equal angle (that is, $\theta$) with the driving element A so as to yield an exact one-to-one rotative relationship therebetween.

Figure 3:
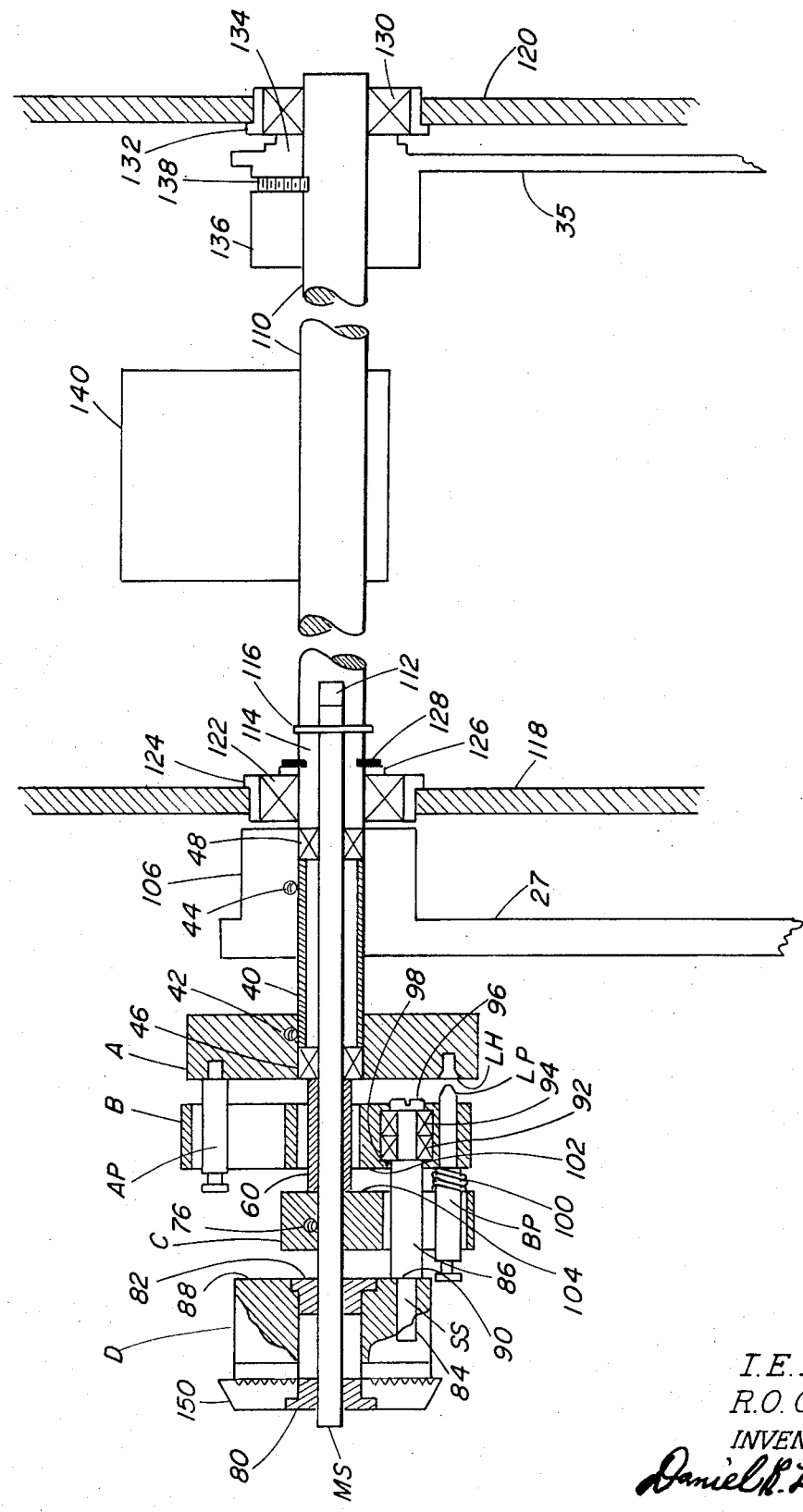
FIG. 3 is a vertical central longitudinal section of the embodiment shown in FIG. 2.

FIG. 2 shows a more detailed structural embodiment of the driving mechanism schematically illustrated in the already-described FIG. 1. As, in FIG. 1, the longitudinal dimensions (i.e., in the direction along the axes of the shafts) have been exaggerated for purposes of clarity, so that the longitudinal distances between the various elements along the shafts, the length of the pins connecting the various elements and the like have been exaggerated, so as to make the FIG. 2 (as well as FIG. 1) analogous to an "exploded view" along the longitudinal (i.e., horizontal) direction. FIG. 3, on the other hand, is proportional (2:1) not only in the vertical direction, but also in horizontal direction, from which it may be seen that the actual (longitudinal) length of the driving pins, shaft segments utilized, and in general the entire driving mechanism is relatively small, so as to yield a relatively compact device. In FIGS. 2 and 3, the main driving element, the intermediary element, the finally driven element, the actuating element, and both of the driving pins connecting the first, second, and third elements, and the various circular openings and radial slots have all been referenced with the same reference characters as utilized in FIG. 1, since all of these elements differ from the corresponding simplified schematic elements at FIG. 1 only in being shown in more detail in FIGS. 2 and 3. In particular, each of the more detailed elements in FIG. 2 labelled A, B, C, D, AP, BP, BO, CO, BS, CS, LP, and LH, can be considered exact equivalents to the correspondingly labelled simpler elements in FIG. 1. Similarly, the secondary shaft SS in FIG. 2 corresponds to the same element as FIG. 1 (except for details), and the main shaft MS is also similarly labelled in both figures, since it is rigidly attached to the driven element C and acts as the axis of rotation for both elements A and C. However, the means for holding the actuator D from rotation when it is in its left-most position (as it is in both FIGS. 1 and 2) in FIG. 2 is substantially different from the simple pin means E shown in FIG. 1, so that it is not referenced in an analogous manner (and will be described subsequently hereafter), but one of its purposes is to hold the actuator D from rotation, and it does accomplish this by holding it relative to some fixed member, F' in FIG. 2 generally corresponding to the fixed stationary element F in FIG. 1.

As previously noted, it will be assumed for purposes of both completeness and concreteness of explanation that the first or driving element A is connected to the pen quadrant 27 in the above-referenced Taylor et al., U.S. patent, which in turn is driven by an electric motor 32 driving a rubber-rimmed driving wheel 33, which is in frictional engagement with an arcuate part 34 of the quadrant. Similarly, it will be assumed that the means that is finally driven, by always being directly connected to the third or final drive element C is an optical attenuator 35, as in the just-mentioned patent. Thus, the overall purpose of the drive mechanism of the invention in the exemplary usage shown in FIG. 2 is to cause either a one-to-one drive ratio (when the locking pin LP is in locking hole LH) or an approximately 5:1 reduction ratio (when the parts are in the position shown in each of these FIGS. 1, 2, and 3) between quadrant 27 (and therefore element A) and element C (and therefore the attenuator 35). In the specific embodiment shown in FIGS. 2 and 3, the exemplary originally driven means (namely, quadrant 27) and the first driving element A of the driving mechanism invention are both rigidly connected to a driving tube 40, for example, by means of one or more set screws 42, 44, respectively. As may best be seen in FIG. 3, elements 27, 40, and A are mounted so as to be freely rotatable about the main shaft MS, as by ball (or other conventional) bearings 46, 48.

As may best be seen in FIG. 2, each of the driving pins AP and BP is preferably tensioned against an edge of the respective slots BS and CS, by springs 50, 52, respectively, between the ends of these respective driving pins and a respective pin 54, 56, which are rigidly attached to elements B and C respectively. Elements 50–56 therefore remove any rotary "backlash" which otherwise might occur, since the driving pins are intentionally of a somewhat smaller external diameter than the width of the radial slots (BS and CS) with which they engage, so as to allow a relative radial movement of the driving pins in these slots. As may best be seen in FIG. 3, a tubular spacer 60 is positioned on the main shaft between the first or driving element A and the final (third) or driven element C, neither of which are intended to ever move longitudinally relative to the main shaft (i.e., horizontal direction in FIG. 3), the main shaft itself also being constrained from such longitudinal movement along its own axis, by any convenient means.

As may be seen in FIG. 2, both the first or driving element A and the third or finally driven element C, has rigidly fastened thereto a pair of pins 62, 64 and 66, 68 respectively (the length of these pins being also exaggerated for purposes of clarity), the ends of which are respectively connected by a pair of tension springs 70, 72. These tension springs perform two functions. First, they insure that the driving element A is resiliently biased toward element C so as to abut against the spacer 60 (see FIG. 3) thereby causing not only element A but also the driving tube 40 and therefore the quadrant 27 to be held in a particular position relative to the finally driven element C and therefore (because of the rigid attachment between element C and main shaft MS, for example, by means of one or more set screws 76) to the main shaft as well. The other purpose of springs 70, 72 is to provide a torsional or rotational restoring force between elements A and C if they are at different relative angles. In particular, whenever the driving element A is an angle other than the "neutral" one shown in FIGS. 1 and 2 and the driving mechanism is in its five-to-one reduction position as shown, the finally driven element C will be at a different angle from its "neutral" position (as shown in FIG. 2) than element A, so that the locking pin LP will not be circumferentially aligned with the locking hole LH. As will be seen subsequently, whenever the driving mechanism is changed from its 5:1 to its 1:1 relationship, the concurrent release of any rotative restraint on element D will free the intermediary element B from being constrained to rotate only about the secondary shaft SS, thereby allowing both elements B and C to rotate so as to be in the same angular position as driving element A (that is, with pins 66 and 68 of element C being parallel to pins 62 and 64 of element A). The two driving or connecting pins AP and BP are also on exactly opposite sides (i.e., 180° apart) of the axis of the main shaft when elements B and C are both at the same angle relative to element A).

The actuating element D is mounted adjacent to the left-hand end of the main shaft MS, by means of, for example, flange bearings or bushings 80, 82, so as not only to be rotatable relative to the main shaft, but also movable longitudinally along the shaft (and in particular, to the right in each of FIGS. 2 and 3). The secondary shaft SS may be rigidly attached to a lower part of the actuating element D as by being press-set therein as indicated generally at 84 (see FIG. 3). A widened central portion of the secondary shaft as at 86 abuts against the right-hand surface 88 of element B, as at 90. The other right-hand end of this greater diameter portion 86 abuts against the first or left-hand one (92) of a pair of ball bearings 92, 94, which allow free rotation of element B about the secondary shaft; but screw 96 and shoulder portion 98 of element B restrain this intermediary element B from longitudinal motion relative to the secondary shaft and therefore relative to the actuating element D. Thus, the intermediary element B is constrained longitudinally (i.e., the horizontal direction in FIG. 3) at all times to a particular fixed distance from the actuating element D. Element B is biased to the right by the compression of a spring 100 on the connecting pin BP, bearing against the facing surfaces 102 and 104, respectively, of element B and C, the latter being completely fixed in the longitudinal direction because of its rigid connection to the main shaft MS (which in turn is fixed in space along its own axis, as will be seen hereinafter). Thus, spring 100 biases the intermediary element B and therefore the actuating element D to the right, so as to tend to move these elements to the right whenever actuator D is allowed to so move. Before explaining the mechanism for releasably holding the actuator D to the left as shown in FIGS. 2 and 3, exemplary means for constraining the main shaft from longitudinal motion will be described.

The main shaft MS so far described is of reduced diameter relative to the shaft segment it may replace, so as to allow the exemplary original quadrant element 27 to be attached to the driving tube 40 without changing the diameter of the opening in its hub portion, generally indicated at 106. The reduced diameter main shaft MS may be attached to a shaft of the original full diameter (see FIG. 3) indicated generally at 110, as by entering into a longitudinal central opening 112 supplied in the left-hand end 114 of the full diameter shaft, and being attached thereto as by means of a pin 116. The original full diameter main shaft 110 (the length of which is shown much diminished relative to the driving mechanism parts already described in FIG. 2, because of the longitudinal exaggeration of these latter parts) may be supported by appropriate bearings in, for example, a pair of relatively widely spaced fixed panels 118, 120. In particular, the panel 118 may be provided with a bearing 122 which is constrained from motion to the left relative to the panel 118 by provision of a (conventional) flange at 124 as indicated. The shaft may be constrained from longitudinal motion to the left relative to the bearing 122, as by the provision of a washer 126 and an E-ring 128, which enters into a groove in the left-hand 114 of the full diameter main shaft 110. The bearing 130 provided in the other fixed panel 120 is restrained from rightward movement as by flange 132. The shaft may be restrained from rightward movement (relative to bearing 130), for example, by causing the reduced diameter right-hand portion 134 of the hub 136 of the attenuator 35 to press against the bearing 130, the hub 136 being rigidly attached to the shaft as by set screw 138. A counterweight may be provided, as at 140, to counterbalance the quite extensive (in the vertical direction in FIG. 3) depending portion of attenuator 35. This counterweight, which may be attached to shaft 110 by any convenient means such as one or more set screws 142 (see FIG. 2), ideally counterbalances not only the attenuator 35, but also any uncompensated out-of-balance weight of the final element C which, of course, is also rigidly attached to the (reduced portion MS of the) main shaft.

As may be seen in FIG. 2, the right-hand face of the flange-like larger diameter portion 150 of the actuator element D is provided with a series of sharp detents or teeth 152. A tooth-like detent 156 at the upper end of each upright portion 158 (only one of which is seen in FIG. 2) of a fork-like pivotable element 160 engages in one of the detents 152 on each side of the actuating element B to both hold it generally to the left as shown in FIG. 2 and at the same time restrain it from rotation about the main shaft axis. The fork-like element 160 is attached, as by screws 162, to the pivoting armature 164 of a solenoid shown generally at 166. In particular, the stationary parts (e.g., the coil) 168 of the solenoid may be attached as by an L-shaped bracket 170 to any fixed member (F'). The armature 164, and therefore the fork 160 attached thereto, is pivotably mounted as by pivot pin 172 to an upper portion of the same bracket 170. Elements 156-164 are biased clockwise about pivot pin 172, by one or more springs 172 stretched between, say, a portion of the foregoing 70 and a holding pin 176 attached to any fixed member.

Thus, as long as the coil of solenoid 166 is energized, the armature 164 will be attracted thereto so as to hold the fork in the position shown in, for example, FIG. 2, whereby the upper portion 158 of the fork (and in particular, the detent portion 156) will hold actuating element D (and therefore element B) in the leftward position shown and simultaneously inhibit it from rotation about the axis of the main shaft MS. Thus, elements 150-168 in the more detailed structural environment perform the same function as schematically illustrated in FIG. 1 by element E and the fact (not illustrated in FIG. 1) that element D (and B) is normally maintained to the left and is moved in the direction of arrow DA only when it is desired to effect a 1:1 ratio of rotation between the driving and driven elements.

Referring specifically to the more detailed structural embodiment of FIGS. 2 and 3, it will be seen that the closing (as shown) of schematically illustrated switch 180 will energize solenoid coil 168 by connecting a (schematically shown) electrical energy source 182 across the leads 184, 186 from the two ends of the coil. As long as the solenoid is so actuated and element D held in the manner just described, the rigidly attached secondary shaft SS will be fixed in space and the intermediary element B will be held to the left so as to disengage the locking pin LP from the locking hole LH in the driving element A. It may be noted that the combined strength of the tension spring (or springs) 174 tending to rotate elements 156-164 clockwise about 172 and the compression of spring 100 tending to push the intermediary element B (and therefore the actuating element D) to the right are weaker than the magnetic force of attraction of armature 164 when the solenoid 166 is energized. Thus, the parts will be in the position illustrated in both FIGS. 2 and 3, and will operate in a manner substantially identical to that described relative to the simplified schematic device of FIG. 1.

OPERATION OF SPECIFIC EMBODIMENT

The specific operation of the more detailed structural embodiment of FIGS. 2 and 3 will be described primarily relative to the additional slightly different details thereof, since its general operation is the same as that described for the simplified version. When the parts are in the approximately 5:1 reduction position as shown (i.e., the fork 160 holding the actuating element D both to the left and non-rotatable), the driving force provided by motor 32 through roller 33 to quadrant 27 will be conveyed through the driving tube 40 to the first or driving element A of the driving mechanism itself. Because of the connection provided by the first interconnecting pin AP, intermediary element B will rotate about the (fixed in space) axis of the secondary shaft SS through a smaller angle of rotation (or at a slower rotation rate) than the driving element A makes about the axis of the main shaft MS. A similar reduction in angular rate will be occasioned by the fact that the second interconnecting pin BP is closer to the axis of rotation (SS) of intermediary element B than it is to the axis of rotation (MS) of the finally driven element C. Since the finally driven element C is rotating substantially slower (i.e., about one-fifth as fast) as the driving element A on the illustrated conditions, the respectively carried pins 62, 64 and 66, 68 will depart from parallelism (at approximately four-fifths of the larger angle $\theta$ through which the driving element A rotates). This causes an additional tension on both of springs 70 and 72 between these pins, which additional tension tends to realign the pins (62–68) whenever the constraints supplied by the two connecting pins AP and BP and in particular the stationary shaft SS are removed. Since the finally driven element C is rigidly connected to the reduced main shaft MS, which in turn is rigidly attached to the full width main shaft 110, the optical attenuator 35 will be rotated at this reduced rate, namely, approximately one-fifth as fast as the quadrant 27 (and therefore the recorder stylus or pen connected thereto) is moved. Thus, if the pen quadrant is moved through an angle (say, 90°) sufficient to move the pen full-scale, the attenuator 35 will move only through approximately one-fifth of this angle, that is, about 18° (which, of course, is also approximately one-fifth of its "full-scale" motion). Therefore, in the exemplary embodiment, the ordinate scale of the pen or stylus recorder will be expanded by a factor of approximately 5 in that one rotary unit of rotation of the optical attenuator 35 will be associated with approximately five units of rotary motion of the pen quadrant 27 and therefore of the pen or stylus itself. This type of augmenting or multiplication (usually referred to as ordinate scale expansion in the spectroscopy arts) may therefore be obtained by energizing the solenoid 68 (as by closing switch 180) so as to cause the parts to assume the position shown in FIGS. 2 and 3.

When such scale expansion is not desired, the solenoid 168 is de-energized as by opening switch 180, allowing spring 174 to swing the fork elements 156–164 clockwise about pivot 172 so as to simultaneously release the actuating element D from being held in its left position and being held from rotation about the main shaft MS. Such release will occasion in general two types of movements of various elements in FIGS. 2 and 3. Firstly, since compression spring 100 is biasing intermediary element B to the right, the release of the longitudinal holding of the rigidly attached (in the longitudinal sense) actuating member D will allow element B to move to the right so as to approach the driving element A. Simultaneously, the release of the rotative restraint on the actuating element D will free the restraint on the secondary shaft SS to the extent that it is now free to revolve about the axis of the main shaft MS. If the finally driven element C and the original driving element A are not in their "neutral" position, that is, with pins 62, 64 and pins 66, 68 being mutually parallel, a torsional force tending to cause such parallelism will be present. Upon the release of the restraint on the secondary shaft SS, the intermediary element B will no longer be restrained to rotate about this secondary shaft, but may rotate as well about any axis (and in particular about the axis of the main shaft MS). Therefore, the springs 70 and 72 are now allowed to cause rotation of element C (and D) and therefore through pin BP of element B (about the axis of the main shaft MS) so as to return pins 62, 64 and pins 66, 68 to parallelism and simultaneously cause the connecting pins AP and BP to assume positions 180° apart relative to the main shaft MS. It may be noted in passing that these relationships will be caused by the torsional force or winding up of springs 70 and 72 upon release of the solenoid, even if the driving element A is not in its upright position (i.e., with connecting pin AP at its top dead center). Therefore, at the same time intermediary element B is allowed to move toward the driving element A (under the force of tension spring 100) the intermediary element B will also be returned to its "neutral position" relative to driving element A, so that the locking pin LP will be circumferentially aligned with the locking hole LH in element A. Since, as noted above, this tendency to align elements A, B, and C (and D) causes such alignment whenever the actuating element B is freed of restraint (provided through SS and D by the illustrated position of the fork element 160) even though the relative angular positions of the elements A, B, and C (and therefore D) are different before release of this restraint, element C will also cause rotation of the main shaft MS (to which it is rigidly attached) and therefore (through the connection at 116 of the large diameter portion 110 of this main shaft) also the optical wedge 35 to the same angular position as the driving element A (and therefore of the rigidly attached quadrant 27). Thus, whenever the 1:1 rotative relationship is desired, and the force of the solenoid 168 is released, all of the elements will be locked together at the same rotative angle, regardless of the position of the quadrant 27 (and therefore the driving element A). Besides this ability to go from the 5:1 to the 1:1 drive ratio at any position of the parts, it is also theoretically possible to go from a 1:1 ratio to a 5:1 ratio at rotative positions other than the normal zero angle position of the parts (i.e., the position shown in FIG. 2 with pin AP at top dead center).

Whenever the switch 180 is opened so as to release the force of the solenoid 168, the fork elements 156–164 will pivot clockwise as seen in FIG. 2 under the direct influence of the tension of spring 174 and under the indirect influence of the compression of spring 100 (biasing element B and therefore element D to the right). As noted above, as soon as the detent 156 at the end of the fork element is restracted from the teeth 152 in element D, springs 70 and 72 will align all four of the elements A, B, C, and D in such manner that pins 62, 64 and 66, 68 will be parallel (so that the connecting pins AP and BP are 180° apart). The immediately subsequent movement of the locking pin portion LP of the lower interconnecting pin BP into the locking hole LH in element A caused by the conjoint movement of elements B and D to the right under the influence of torsion spring 100 will cause all four elements (A, B, C, and D) to be locked together so that they may only conjointly rotate about the axis of the main shaft. In particular, elements A and B will be so locked together in view of the fact that both the upper and lower connecting pins (AP and BP) are now connected to both elements; element C will be constrained to rotate with element A (and therefore element B) because both elements A and C are always constrained to rotate about the axis of the main shaft MS (in fact, element C rotates rigidly therewith) and elements A and C will now be interconnected by the lower pin BP; in an analogous manner, elements B and D will be constrained to rotate at the same speed and about the same axis, in view of their connection by the secondary shaft SS and their mutual constraint to rotate about the axis of the main shaft (element D being always so constrained, while element B will now be constrained to so rotate because of its connection by both pins AP and BP to element A which in turn is so constrained). Thus, all four elements will be so constrained as to be in effect locked together for conjoint rotation about the axis of the main shaft MS. Thus, the driving element A and the finally driven element C will be directly locked together so as to cause driving tube 40 and therefore the pen quadrant 27 to be ultimately locked to the main shaft MS and therefore to its thicker continuation 110 and the optical attenuator 35 connected thereto.

SPECIFIC EXAMPLE OF SPEED REDUCTION MODE

Figure 4:
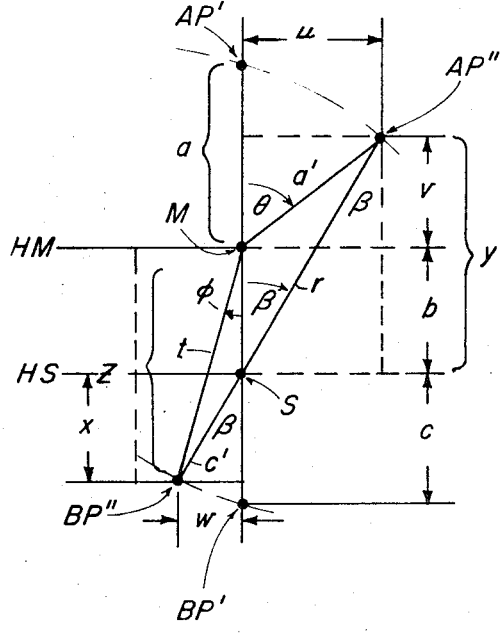
FIG. 4 is a diagramatic illustration of how the parts move when they are in the angular reduction position, as shown in FIGS. 1, 2 and 3.

FIG. 4 is a schematic representation of the manner in which the various elements and in particular the two interconnecting pins AP and BP will move when the parts are in the five-to-one reduction ratio condition (as shown in FIG. 1 and in FIGS. 2 and 3 for the simplified and specific embodiment respectively). In FIG. 4, point M represents the axis of the main shaft and the point S the axis of the secondary shaft, it being assumed that element D and therefore the secondary shaft have been constrained from movement in that position of the secondary shaft directly below the main shaft (as illustrated in each of FIGS. 1, 2, and 3). The point AP' (directly above points S and M) in FIG. 4 represents the center of the first connecting pin AP when it is in its uppermost position (as shown again in FIGS. 1–3), while the distance $a$ is the distance between the center of pin AP and the axis of the main shaft at M (see also FIG. 1). It may be noted that this distance, $a$, is a constant for any rotative position of the pin AP. The horizontal lines HM and HS represent the horizontal planes (thereby giving the height) through the axis M of the main shaft and the axis S of the secondary shaft, respectively; and the invariable distance between these planes (or corresponding centers of the axes M and S) is indicated at $b$. The point BP' directly below point AP', M and S indicates the center of the pin BP when it is 180° from (i.e., directly below) the position of the first connecting pin AP (again, as shown in FIGS. 1–3). The invariable distance between the axis S of the secondary shaft (SS) and the second pin BP is labeled $c$ (see also FIG. 1).

With the parts originally in this starting position, assume that the original driving element A has been rotated clockwise, so that its rigidly held first connecting pin AP now has its center at point AP''. This rotation of element A and in particular the first connecting pin AP through an angle $\theta$ as "seen" from the axis of the main shaft will cause element B to rotate through a lesser angle $\beta$ measured from the center of rotation of element B, namely, the axis S of the secondary shaft (SS). This angle $\beta$ will thus be measured between the vertical line joining point S and AP' and the line $r$ joining points S and AP'' shown in FIG. 4. Rotation of element B about the center S of the secondary shaft (SS) will of course cause the second pin BP to rotate about the same axis S through the same angle $\beta$ as element B, so that it will move to a position indicated at BP'' (which of course will still be the same fixed distance $c$ from axis center S). Movement of the lower or second interconnecting pin to the position BP'' will rotate the third element C through an angle $\phi$ as measured from its center of rotation, namely, the axis M of the main shaft (MS). As shown in FIG. 4, this angle $\phi$ is measured about point M between lines connecting point M to the original position (BP') of the second pin and the line $t$ between the axis M and the new position BP'' of this second interconnecting pin.

The horizontal distance between the original location of the upper interconnecting pin at AP' to its particular exemplary position AP'' is referenced $u$ (i.e., $u$ is the distance between the projection of points AP' and AP'' onto a horizontal plane perpendicular to the plane of the paper or line in the plane of the paper of FIG. 4). The height above the horizontal line or plane HM through point M and the specific position to which the first connecting pin has moved at point AP'' is referenced $v$. For the second or lower interconnecting pin (AP) the corresponding horizontal distance it moved from its original position BP' to BP'' is referenced $w$; while its "height" below the horizontal plane or line HS (through the axis S of the secondary shaft (SS) about which the pin rotates) for the particular position at BP'' is referenced $x$.

It may be noted that the dimensions $a$, $b$, and $c$ are invariable, while the horizontal and vertical "coordinates" of the particular position of both the upper pin, as at AP'', namely, $u$ and $v$, and the lower pin (as at BP''), at $w$ and $x$, respectively, will vary depending on the rotative position of say, element A (and therefore all the other moving elements). Similarly, the two line segments $a'$ and $c'$ interconnecting a particular position (AP'' and BP'' respectively) of the two pins to their axis of rotation are invariable in length but will of course vary in position. And finally, the two line $r$ and $t$ respectively connecting the particular positions (AP'' and BP'') to the axis about which they are not constrained to rotate will vary both in position and in length depending on the particular position of, say, element A and therefore the other elements. Merely for convenience, the total "height" or vertical distance between the particular exemplary final positions of the first and second pins relative to the horizontal line or plane to the axis about which they do not rotate is labeled $y$ and $z$, respectively; $y$ is of course equal to the sum of the "height" $b$ of the first pin above the horizontal plane finding its axis of rotation (HM) and the distance between this horizontal plane and the plane HS of the other secondary axis S, namely, the constant $b$; while the "height" $z$ from the second pin at position BP'' to the horizontal plane HM of the other axis M at $z$ is of course equal to the "height" $x$ of the point BP'' from horizontal plane or line HS plus the same constant distance $b$ between the two horizontal lines or planes HS and HM.

From FIG. 4, various general relationships between the angles and distances shown in FIG. 4 may be developed. Thus, from either of the right triangles having $r$ as its hypotenuse, one may obtain:

$$\tan \beta = u/y = u/(v+b) \qquad (1)$$

From the right triangle having $a'$ as its hypotenuse, one may obtain both of the following relationships:

$$\sin \theta = u/a' \qquad (2a)$$

$$\cos \theta = v/a' \qquad (2b)$$

Rewriting the last two expressions one may obtain:

$$u = a' \sin \theta \quad (3a)$$

$$v = a' \cos \theta \quad (3b)$$

Substituting these values for $u$ and $v$ into the first equation (1) and noting that $a'$ and $a$ are identical in length, we may write:

$$\tan \beta = (a \sin \theta)/(a \cos \theta + b) \quad (4)$$

From the triangle having $t$ as its hypotenuse, one may write:

$$\tan \phi = w/z = w/(x+b) \quad (5)$$

From the small triangle having $c'$ as its hypotenuse and noting that its apex angle is also $\beta$ because interior angles are always equal, we may write the following two relationships:

$$\sin \beta = w/c' \quad (6a)$$

$$\cos \beta = x/c' \quad (6b)$$

Rearranging and noting that $c'$ is equal in length to $c$, we may write:

$$w = c \sin \beta \quad (7a)$$

$$x = c \cos \beta \quad (7b)$$

Substituting these values for $w$ and $x$ into the above equation (5), we obtain:

$$\tan \phi = (c \sin \beta)/(c \cos \beta + b) \quad (8)$$

From the above and the well-known identity that the tangent of any angle equals its sine divided by its cosine, we may tabulate the following:

$$\tan \theta = \sin \theta / \cos \theta \quad (9a)$$

$$\tan \beta = (a \sin \theta)/(a \cos \theta + b) \quad (9b)$$

$$\tan \phi = (c \sin \beta)/(c \cos \beta + b) \quad (9c)$$

The last three equations indicate the symmetrical manner in which each of the rotation angles for the elements A, B, and C become progressively smaller, although it is not obvious from these equations that the ratio of the input angle $\theta$ (i.e., of element A) to the output angle $\phi$ (of element C) is essentially invariable at least for values of $\theta$ no greater than about 90°. In particular, an actual working embodiment of the invention, corresponding very closely to that shown in FIGS. 2 and 3 has been made successfully with the following dimensions: the distance between the axis (M) of the main shaft MS and the central axis of the first connecting pin AP (as measured along element A), corresponding to dimension $a$ shown in FIGS. 1 and 4 was 0.438 ($\pm$ 0.005) inches; the distance between the center (S) of the secondary shaft SS and the center M of the main shaft (as measured, for example, along the surface of element D), corresponding to dimension $b$ shown in FIGS. 1 and 4 was 0.304 ($\pm$ 0.003); and the distance between the center (S) of the secondary axis and the center of the second connecting pin BP (as measured along element B), corresponding to the dimension $c$ in FIGS. 1 and 4 was 0.156 ($\pm$ 0.001). For very small angles, so that the tangent of an angle can be assumed to be approximately equal to sine of angle, which in turn can be considered equal to the angle itself; and the cosine of the angle can be considered to be substantially 1, we may substitute into equation (9b) the values of $a$ and $b$ given above, and making the small angle assumptions, thusly:

$$\tan \beta \cong \beta \cong 0.438\theta/[0.438(1)+0.304] = (0.438/0.742)\theta = 0.590\theta \quad (10a)$$

Similarly, for equation (9c), making the small angle assumptions and substituting the above values for $c$ and $b$, we may write:

$$\tan \phi \cong \phi \cong 0.156\beta/[0.156(1)+0.304] = (0.156/0.460)\beta = 0.339\beta \quad (10b)$$

Substituting the right-hand term of equation (10a) for the last $\beta$ in equation (10b):

$$\phi \cong (0.339)(0.590)\theta = 0.200\theta \quad (11a)$$

$$\theta = 5.00\phi \quad (11b)$$

Although it is not obvious from equations (9a), (9b), and (9c) (which are exact), nevertheless it can be emperically shown that at least for exemplary values of $a$, $b$, and $c$ similar to those indicated above, the ratio of the input angle $\theta$ to the output angle $\phi$ is invariable to one part in 500 (i.e., one-fifth of 1 percent) for all values of $\theta$ no greater than 90° (the largest angle through which the quadrant 27 and therefore the driving element A is ever moved.

For the following, exemplary values of $a = 0.438$ and $c = 0.156$ (as before) were used in the computation, but the somewhat different value, $b = 0.313$ was used, so that the substantially constant final ratio of $\theta/\phi$ was about 5.15, as will be seen from the following tables giving the computations using the equations (9b) and (9c) above and including both the ratio between the movement angles of the adjacent elements A, B, and C (namely, $\theta/\beta$ and $\beta/\theta$) and the final input to output angular ratio ($\theta/\beta$).

A. USING TAN $\beta = (a \sin\theta)/(a \cos\theta + b)$

| | I | II | III (.438) | IV | V (0.438) | VI (0.313) |
|---|---|---|---|---|---|---|
| | $\theta$ | $\sin\theta$ | $Xa$ | $\cos\theta$ | $Xa$ | $+b$ |
| 1. | 10° | .17365 | .0760587 | .98481 | .4313468 | .7443468 |
| 2. | 20° | .34202 | .1498048 | .93969 | .4115842 | .7245842 |
| 3. | 30° | .50000 | .2190000 | .86603 | .3793211 | .6923211 |
| 4. | 40° | .64279 | .2815420 | .76604 | .3355255 | .6485255 |
| 5. | 50° | .76604 | .3355255 | .64279 | .2815420 | .5945420 |
| 6. | 60° | .86603 | .3793211 | .50000 | .2190000 | .5320000 |
| 7. | 70° | .93969 | .4115842 | .34202 | .1498048 | .4628048 |
| 8. | 80° | .98481 | .4313468 | .17365 | .0760587 | .3890587 |
| 9. | 90° | 1.00000 | .4380000 | 0 | 0 | .3130000 |

| | VII tan $\beta$ | VIII $\beta$ (degrees) |
|---|---|---|
| 1. | 0.1021818 | 5.8342 |
| 2. | 0.206745 | 11.6803 |
| 3. | 0.316327 | 17.5541 |
| 4. | 0.434126 | 23.4679 |
| 5. | 0.564342 | 29.4366 |
| 6. | 0.713009 | 35.4888 |
| 7. | 0.889325 | 41.6477 |
| 8. | 1.108693 | 47.9511 |
| 9. | 1.399361 | 54.4502 |

B. USING TAN $\phi = (c \sin\beta)/(c \cos\beta + b)$

| | I | II | III (.156) | IV | V 0.156 | VI +b |
|---|---|---|---|---|---|---|
| | $\beta$ | $\sin\beta$ | $Xc$ | $\cos\beta = \sin(90-\beta)$ | $Xc$ | (0.313) |
| 1. | 5.8342 | .10167 | .015861 | .99482 | .155192 | .468192 |
| 2. | 11.6803 | .20244 | .031581 | .97929 | .152769 | .465769 |
| 3. | 17.5541 | .30161 | .047051 | .95343 | .148735 | .461735 |
| 4. | 23.4679 | .39824 | .062125 | .91728 | .143096 | .456096 |
| 5. | 29.4366 | .49146 | .076668 | .87090 | .135860 | .448860 |
| 6. | 35.4888 | .58055 | .090566 | .81423 | .127020 | .440020 |
| 7. | 41.6477 | .66455 | .103670 | .74725 | .116571 | .429571 |
| 8. | 47.9511 | .74257 | .115841 | .66976 | .104448 | .417448 |
| 9. | 54.4502 | .81361 | .126923 | .58141 | .090700 | .403700 |

| | VII tan $\phi$ | VIII | $\phi°$ |
|---|---|---|---|
| 1. | .03387 | 1.9400 | |

| 2. | .06780 | 3.8789 |
| 3. | .10190 | 5.8182 |
| 4. | .13621 | 7.7565 |
| 5. | .17081 | 9.6933 |
| 6. | .20582 | 11.6289 |
| 7. | .24133 | 13.5683 |
| 8. | .27750 | 15.5105 |
| 9. | .31440 | 17.4526 |

C. FROM THE ABOVE VALUES OF $\beta$ AND $\phi$

| | I<br>$\theta$ | II<br>$\theta/\beta$ | III<br>$\beta/\phi$ | IV<br>$\theta/\phi$ |
|---|---|---|---|---|
| 1. | 10° | 1.714 | 3.007 | 5.1546 |
| 2. | 20° | 1.712 | 3.011 | 5.1561 |
| 3. | 30° | 1.709 | 3.017 | 5.1562 |
| 4. | 40° | 1.704 | 3.026 | 5.1569 |
| 5. | 50° | 1.699 | 3.037 | 5.1582 |
| 6. | 60° | 1.691 | 3.052 | 5.1596 |
| 7. | 70° | 1.681 | 3.069 | 5.1591 |
| 8. | 80° | 1.668 | 3.092 | 5.1578 |
| 9. | 90° | 1.653 | 3.120 | 5.1568 |

As may be seen from the foregoing values of the ratios of the angular reduction rates between elements A and B (namely $\theta/\beta$) and between B and C (namely $\beta/\phi$) given in the last table C, each of these ratios does vary by more than 3 percent over the entire range of different angular positions of element A. Nevertheless, because these angular rotation ratios of adjacent elements vary in value in the opposite direction and by substantially equal increments (as measured in percent), the overall angular rotation ratio of element A to element C (namely, $\theta/\phi$) varies by less than one-fifth of 1 percent (i.e., less than 0.01 in 5.15 or less than one part per 515).

For the other numerical example mentioned in which $a$ and $c$ are the same but $b$ was 0.304 a similar compensation of the changes in relative rotation rates of the adjacent elements occurs so that the overall angular reduction ratio remains 5:1 within a small fraction of a percent (e.g., this ratio is 4.995:1 at $\theta = 50°$, $\beta$ being 29.81° and $\phi$ being 10.01° at this point). Thus, in general, the inventive device yields an almost constant overall reduction in the ratio of the angular movement of the original driving element A to the final driven element C, despite the fact that there is variation in the ratio of angular movements of adjacent elements in the three element drive.

OTHER ADVANTAGES OF THE INVENTION

The device may be used to "expand" any small part (i.e., less than 20 percent) of the total range (100 percent) of use in the 1:1 range. For example, if the sample material in a spectrophotometer is known to transmit between 16 percent and 36 percent (i.e., absorb between 84 and 64 percent) of the radiation over a particular wavelength (or wavenumber) range, the device may use the 20 percent transmission point at the "-neutral" or starting point by running the device to 20 percent transmission point in the 1:1 mode (i.e., all three elements rotated clockwise approximately 72° from the FIGS. 1–3 positions assuming approximately 90° rotation of element A and its connected attenuator 35 represents 0 percent transmission, that is 100 percent absorption). As the scan of the particular wavelength (or wavenumber) range is started, the solenoid is actuated so as to cause the device to thereafter be in its 5:1 reduction mode, and then scanning of the (16 to 36 percent transmission) wavelength range commenced. The recorder output (connected to quadrant 27) will then give readings in which the 20 percent (transmission) ordinate "line" represents 20 percent, but all values different from 20 percent (transmission) will actually be "expanded" by a factor of 5. Thus, a 50 percent (transmission) readout will actually represent 20 percent + one-fifth of (50 − 20 percent), or 20% + 1/5 (30%) = 20% + 6% = 26% actual transmission, since the recorder readout "expansion" only occurs between 20 and 50 percent (transmission). Similarly a 10 percent (transmission) readout would correspond to an actual 20% − 1/5 (20 − 10)% = 20% − 1/5 (10%) = 20% − 2% = 18% actual transmission.

In general, the device may be run in its 1:1 ratio to any value (angle of the elements) and then the 5:1 mode initiated to give augmented recorder values for any value differing from (i.e., "around") this value. It is thus possible, for example, when a sample is known to be approximately 60 percent transmitting in a certain wavelength (or wavenumber) range, to run at 1:1 to, say, exactly 60 percent transmission and then engage the 5:1 solenoid, as long as it is remembered that recorder values departing from 60 percent transmission will then be expanded in both directions by a factor of 5 (that is, the attenuator actually moves only one-fifth as far from its 60 percent transmission position as the recorder output will indicate). In other words if the 5:1 mode is engaged at 60 percent transmission, a subsequent recorder value of 20 percent (transmission) will mean that the transmission is the original 60 percent transmission, less the 1/5 × 40% (drop from 60 to 20 percent), or 60% − 8%, equal to 52 percent (transmission). Thus the device allows "scale expansion" around any desired value of initial transmission, which ability is useful in improving the readability (or apparent "resoltuion") of the recorder scale when only small changes in transmission (i.e., less than 20 percent range) are expected for a particular sample (in some wavelength or wavenumber range, which may be any part or even all of the wavelength or wavenumber range scanned by the spectrophotometer for that sample). This ability to expand any (less than 20 percent changing) sample absorption range (as a transmission percentage) is of course a direct result of the fact that in the 1:1 ratio position, all three elements A, B and C remain in the same rotative position relative to each other, so that pins AP and BP are still 180° apart, pins 68, 72 are still parallel to pins 62, 64 and the various other parts maintain the same relative positions to each other even though all have rotated in space. As long as the attenuator 35 is linear in its "taper" (i.e., its relative transmission or absorption is linear with its angular position) such change from 1:1 to the 5:1 ratio causes no difficulty as long as the operator knows the (1:1 or actual) transmission value at which the 5:1 ratio was engaged. Of course if the recorder "expansion" is initiated at 0 percent transmission (all the parts turned 90° clockwise from the position shown in FIGS. 1 and 2) for very strong sample absorption (low transmission), then the recorder readout simply is five times the actual transmission (attenuator position) without requiring any arithmetic (other than division by 5) to determine the actual sample transmission. At the other end of the scale (i.e., near 100 percent transmission) for quantitative analysis of (known to be) the same absorbing sample constituent, if scale expansion about the 100 percent transmission (parts as shown in FIG. 2) value is used for both samples, little arithmetic is required to determine the proportional percentage of absorption since the readout will be 100 − 5 $m$ for the first sample and 100 − 5 $n$ for the second sample (below 100 percent transmission), where $m$ and $n$ are the actual percentage absorptions; and the ratio of $5m:5n$ gives the relative absorption percentages of the two sample constituents directly (since the ratio is equal to $m:n$). For example if one sample yields 90 percent transmission under such circumstances (100 − 10 percent) and the other 70 percent transmission (100 − 30 percent), the ratio of absorption percentage is 10:30 or 1:3 (in this case $m = 2$ and $n = 6$, but they need not be computed). As previously noted, the springs 70, 72 allow return to the 1:1 mode (and therefore direct readout of the attenuator position) at any position of the elements regardless of at what position of the elements the 5:1 mode was either initiated or is desired to be terminated (i.e., return to the 1:1 mode is desired); this is true since the springs always bring elements A and C to the same relative rotative position, and then the locking pin LP locks them in this position regardless of the previous angular absolute and relative angular positions of elements A and C. Therefore return to the 1:1 ratio drive always brings the attenuator into the same (equal) position as the pen quadrant, so that the 1:1 ratio connection always "recalibrates" the pen actual (transmission) percentage effect of the attenuator to equal values.

What is claimed is:

1. An angular motion transmitting device for optionally causing a substantially fixed ratio angular displacement rate between one member attached to rotate with a first element and another member attached to rotate with a third element of a three-element angular drive, and optionally causing another, substantially fixed different ratio displacement rate between said first and third elements and therefore said one member and said other member attached respectively thereto, comprising:
   A. a second rotatable element constrained to rotate about a first fixed axis coinciding with the axis of rotation of said one member;
   B. means normally constraining said third rotatable element to rotation about a second axis remote from said first axis;
   C. first means normally interconnecting said second and third elements at points on said elements remote from said first and second axes;
   D. second means interconnecting said first and third elements at points on said elements remote from said first and second axes; and
   E. optionally operable means for simultaneously releasing said third element constraining means and causing said second interconnecting means to directly connect said second and third elements together at points thereon remote from said first axis,
   whereby said second interconnecting means causes said second and third elements to rotate at another different angular rate than when said third element is constrained and said first and second elements are connected indirectly through said third element and said first and second interconnecting means.

2. An angular motion transmitting device according to claim 1, in which:
   said first and second axes are mutually parallel.

3. An angular motion transmitting device according to claim 2, in which:
   said first and second interconnecting means are mutually parallel and are also parallel to said mutually parallel first and second axes;
   whereby said first interconnecting means connects points of said first and third elements equidistant from said first axis, and said second interconnecting means connects points of said second and third elements equidistant from said second axis.

4. An angular motion transmitting device according to claim 3, in which
   said first interconnecting means is closer to said first axis than to said second axis, so that said third element, when constrained to rotate about said second axis, rotates at a smaller angular rate than said second element, and
   said second interconnecting means is closer to said second axis than said first axis, so that said first element rotates at a smaller angular rate than said third element,
   whereby the angular rotation rate of said second element relative to said first element is the compound reduction rate caused by each of said second to third element and of said third to first element angular rate reductions.

5. An angular motion transmitting device according to claim 1, in which:
   said second axis, said first interconnecting means and said second interconnecting means are all mutually parallel to each other and to said coincident first axis;
   said first interconnecting means is generally on the side of said coincident first axis which is remote from said second axis, so as to be closer to said first axis than to said second axis, whereby said third element normally rotates at a smaller angular rate than said second element;
   said second interconnecting means is generally on the side of said second axis which is remote from said first axis, so as to be closer to said second axis than to said first axis, whereby said first element normally rotates at a smaller angular rate than said third element,
   whereby the angular rotation rate of said second element relative to said first element is the compound reduction rate caused by both said first to third element and said second to third element angular rate reductions.

6. A rotary motion transmitting device according to claim 1, in which:
   resilient means are connected between said first and third rotatable elements tending to return them to a particular angular position relative to each other, and said second interconnecting means is of such construction as to lock said first and third elements in said particular angular position,
   whereby said optionally operable means always causes said first and third rotatable elements to be connected in the same particular angular relationship to each other when they are caused to rotate at said other different rate.

7. Means for optionally providing a choice of preselected fixed ratio angular displacement rates between an input shaft and an output shaft, comprising in combination,
- A. a first angularly rotatable driven element affixed to a first shaft;
  1. first means forming an arcuate opening in said first element freely receiving a second shaft passed therethrough parallel to said first shaft,
  2. second means forming a radial opening in said first element;
- B. a second angularly rotatable element affixed to said second shaft;
  1. said first shaft passing freely through an arcuate opening in said second element,
  2. a radial opening formed in said second element;
- C. a third shaft parallel to said first and second shafts affixed to said second element and releasably engaged with said radial opening in said first element,
- D. a third angularly rotatable element freely rotatable about the axis of said first shaft;
- E. a fourth shaft mounted on said third element and extending parallel to said first, second and third shafts into driving engagement with the radial opening in said second element;
  1. first releasable locking means between said second and third elements,
  2. second releasable locking means between said second shaft and a stationary member, and
- F. means interconnecting said first and second locking means causing said first locking means to be released when said second locking means is engaged with said stationary member, and said second locking means to be released when said first locking means engages said second and third elements, whereby said third element and its output shaft is driven through said second element and said third shaft at an angular displacement rate greater than the angular rate of said first element about said first shaft when said first locking means is released and said second locking means is engaged, and said second and third elements are driven at the same rate when said first locking means is engaged and said second locking means is released.

* * * * *